US012654646B1

(12) United States Patent　　　(10) Patent No.:　US 12,654,646 B1

Furtado et al.　　　(45) Date of Patent:　Jun. 16, 2026

(54) VEHICLE INCLUDING MOVABLE FLOOR PANEL

(71) Applicant: Toyoda Gosei Co., Ltd., Kiosu (JP)

(72) Inventors: Roland D. Furtado, Novi, MI (US); Alexandra Lazaros, Northville, MI (US); Ning Zhang, Beverly Hills, MI (US)

(73) Assignee: TOYODA GOSEI CO., LTD, Kiosu (JP)

( * ) Notice: Subject to any disclaimer, the term of this patent is extended or adjusted under 35 U.S.C. 154(b) by 0 days.

(21) Appl. No.: 19/194,666

(22) Filed: Apr. 30, 2025

(51) Int. Cl.
| | |
|---|---|
| *B60R 21/231* | (2011.01) |
| *B60R 21/09* | (2006.01) |
| *B60R 21/206* | (2011.01) |
| *B60R 21/215* | (2011.01) |

(52) U.S. Cl.
CPC ............ *B60R 21/231* (2013.01); *B60R 21/09* (2013.01); *B60R 21/206* (2013.01); *B60R 21/215* (2013.01); *B60R 2021/21537* (2013.01); *B60R 2021/23169* (2013.01); *B60R 2021/23176* (2013.01)

(58) Field of Classification Search
CPC . B64D 11/06205; B60R 21/09; B60R 21/215; B60R 2021/23176
USPC ...................................................... 280/734
See application file for complete search history.

(56) References Cited

U.S. PATENT DOCUMENTS

| | | | | |
|---|---|---|---|---|
| 11,400,883 | B2 * | 8/2022 | Yamada ................ | B60R 21/206 |
| 11,491,939 | B2 * | 11/2022 | Freisler ............ | B60R 21/01512 |
| 11,897,409 | B2 * | 2/2024 | Gould ................. | B60R 21/0136 |
| 11,945,393 | B2 | 4/2024 | Freisler et al. | |
| 2005/0062264 | A1 * | 3/2005 | Arwood ................ | B60R 21/206 |
| | | | | 280/752 |

FOREIGN PATENT DOCUMENTS

| | | | | |
|---|---|---|---|---|
| DE | 102019132986 A1 * | 6/2021 | ............. | B60R 21/20 |
| EP | 2256004 A1 * | 12/2010 | ........... | B60R 21/231 |
| KR | 100993032 B1 * | 11/2010 | ............... | B60N 3/06 |

OTHER PUBLICATIONS

Computer generated English translation of KR 10 0993032 (Year: 2025).*
Computer generated English translation of DE 102019132986 (Year: 2026).*

* cited by examiner

*Primary Examiner* — Paul N Dickson
*Assistant Examiner* — Tiffany L Webb
(74) *Attorney, Agent, or Firm* — Dinsmore & Shohl LLP

(57)　　　　ABSTRACT

A footwell includes a lower floor panel, a movable floor panel extending from the lower floor panel, and an actuator operable to move the movable floor panel from an extended position to a retracted position in response to an occurrence of a collision being determined or predicted based upon environment data collected by a collision sensor.

20 Claims, 10 Drawing Sheets

VEHICLE INCLUDING MOVABLE FLOOR PANEL

TECHNICAL FIELD

The present specification generally relates to vehicle footwells and, more specifically, maintaining a space within a footwell during a vehicle collision.

BACKGROUND

During front end vehicle collisions, the front end of the vehicle compacts rearward due to collision forces. As it is known to provide the front end of vehicles with crush boxes to absorb collision forces, a bottom of a footwell of the vehicle may intrude into a space in which the feet of front occupants are provided. The rearward movement of the bottom of the footwell decreases an amount of space provided for the front occupants.

Accordingly, a need exists for maintaining a space for front occupants' feet during a front end vehicle collision.

SUMMARY

In one embodiment, a footwell includes: a lower floor panel; a movable floor panel extending from the lower floor panel; and an actuator operable to move the movable floor panel from an extended position to a retracted position in response to an occurrence of a collision being determined or predicted based upon environment data collected by a collision sensor.

In another embodiment, a vehicle includes: a frame defining an interior cabin; a driver seat mounted to the frame within the interior cabin; a collision sensor configured to collect environment data used to determine or predict an occurrence of a collision; a footwell provided forward of the driver seat in a vehicle longitudinal direction, the footwell including: a lower floor panel fixed to the frame; a movable floor panel extending from the lower floor panel; and an actuator operable to move the movable floor panel from an extended position to a retracted position in response to an occurrence of a collision being determined or predicted based upon environment data collected by the collision sensor.

In yet another embodiment, a method includes: detecting or predicting an occurrence of a collision; and operating, in response to detecting or predicting the occurrence of the collision, an actuator to move a movable floor panel of a footwell from an extended position to a retracted position, the movable floor panel extending from a lower floor panel of the footwell.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
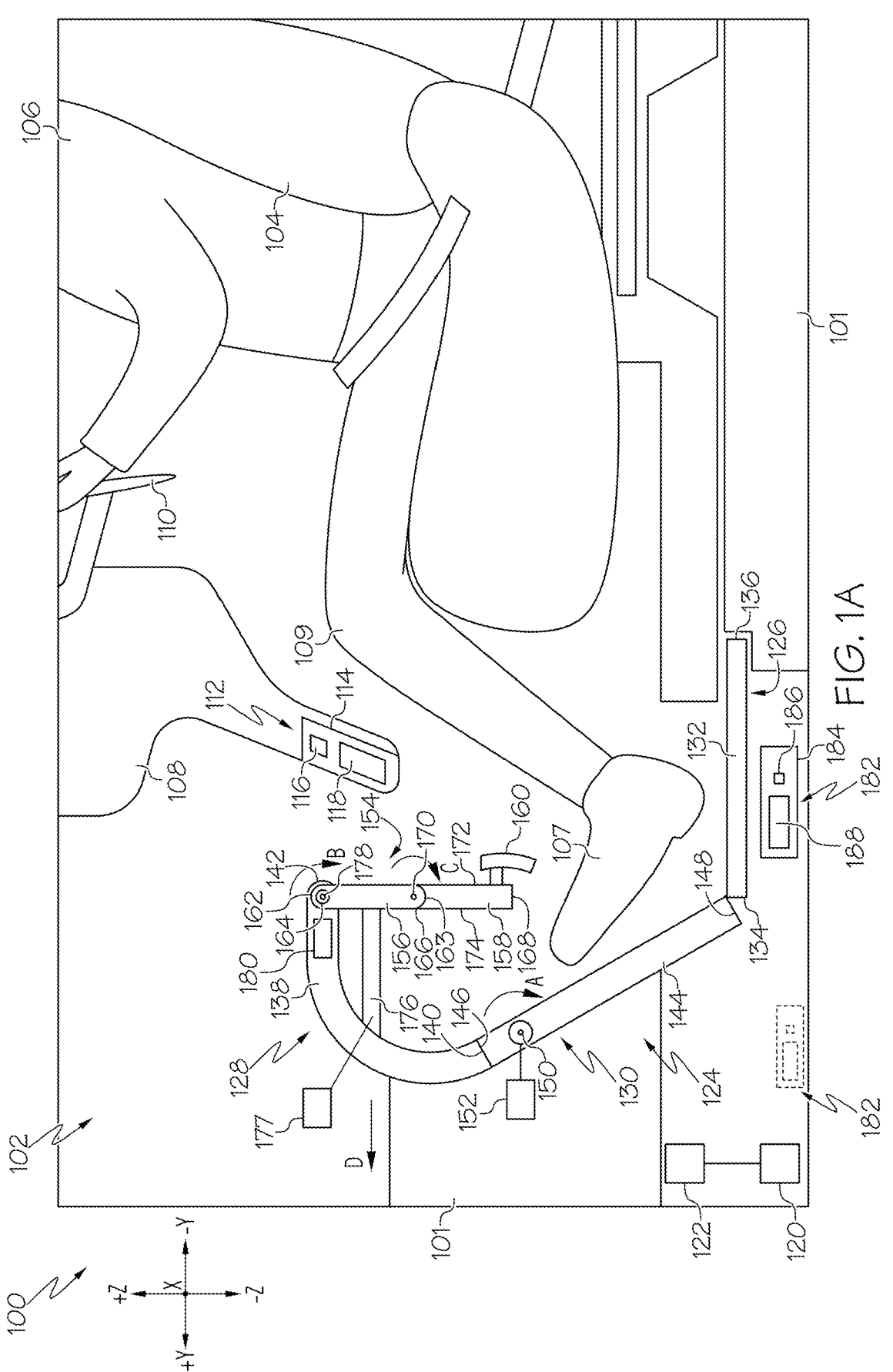
FIG. 1A schematically depicts a partial side view of an embodiment of a vehicle including a footwell having components illustrated in an extended position, according to one or more embodiments shown and described herein.

Embodiments described herein are directed to vehicle and footwells that maintain a space in front of a driver's feet during a front end vehicle collision. The footwell includes a lower floor panel, a movable floor panel extending from the lower floor panel, and an actuator. The actuator is operable to move the movable floor panel from an extended position to a retracted position in response to an occurrence of a collision being determined or predicted based upon environment data collected by a collision sensor. Various embodiments of the footwells and the operation of the footwells are described in more detail herein. Whenever possible, the same reference numerals will be used throughout the drawings to refer to the same or like parts.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the term "vehicle longitudinal direction" refers to the forward-rearward direction of the vehicle (i.e., in the +/−Y direction of the coordinate axes depicted in FIG. 1A). The term "vehicle lateral direction" refers to the cross-vehicle direction (i.e., in the +/−X direction of the coordinate axes depicted in FIG. 1A), and is transverse to the vehicle longitudinal direction. The term "vehicle vertical direction" refers to the upward-downward direction of the vehicle (i.e., in the +/−Z direction of the coordinate axes depicted in FIG. 1A). As used herein, "upper" and "above" are defined as the positive Z direction of the coordinate axes shown in the drawings. "Lower" and "below" are defined as the negative Z direction of the coordinate axes shown in the drawings.

Directional terms as used herein—for example up, down, right, left, front, back, top, bottom—are made only with reference to the figures as drawn and are not intended to imply absolute orientation.

Figure 1B:
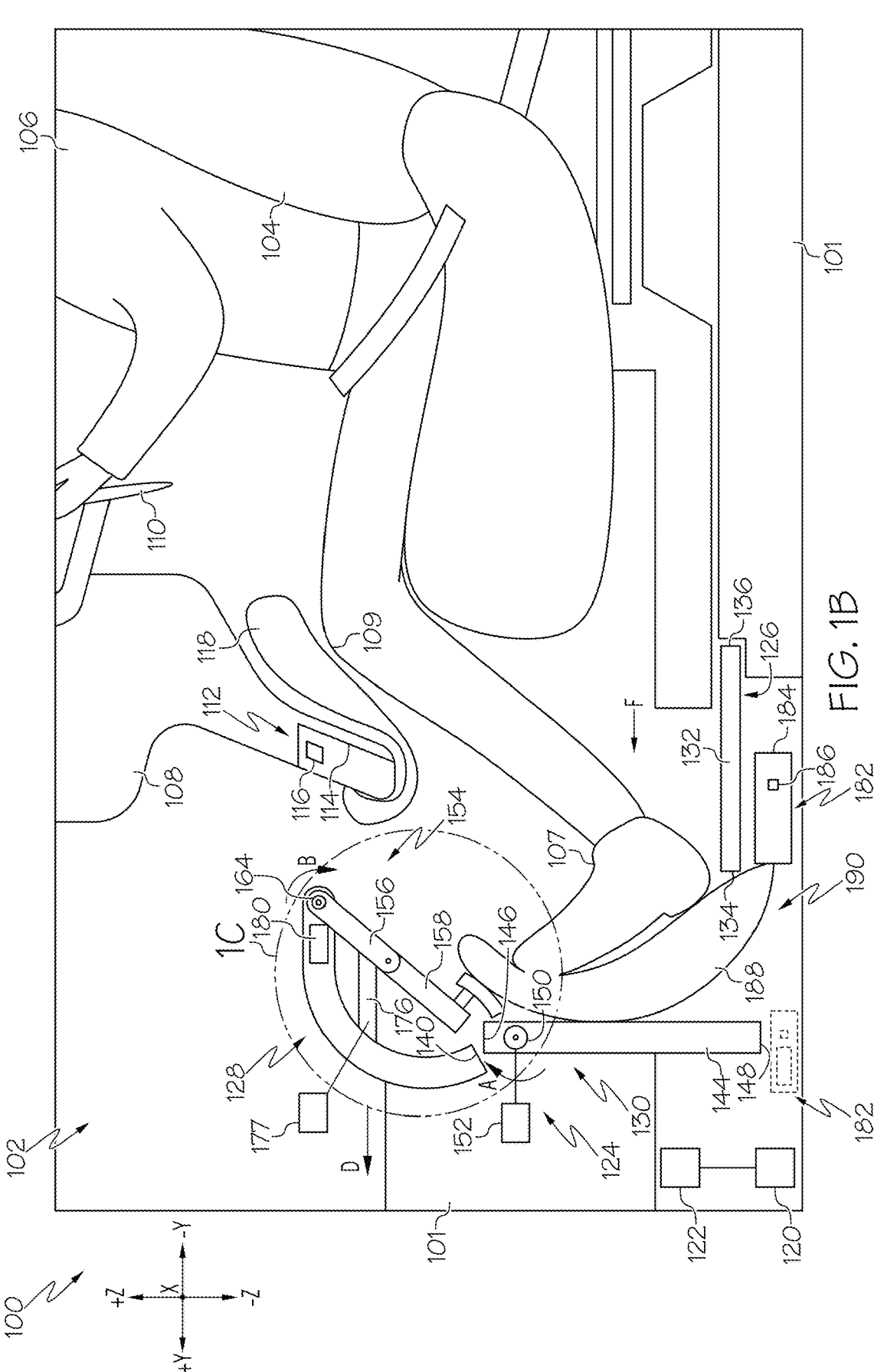
FIG. 1B schematically depicts a partial side view of the vehicle of FIG. 1A illustrating the components of the footwell in a retracted position, according to one or more embodiments shown and described herein.

Referring now to FIGS. 1A and 1B, a partial view of a vehicle 100 is illustrated according to one or more embodiments described herein. The vehicle 100 includes a frame 101 defining an interior cabin 102 in which a driver seat 104 is provided. As shown, a driver 106 is seated in the driver seat 104. Although obstructed from the view illustrated in FIG. 1A, the vehicle 100 may include a front passenger seat provided next to the driver seat 104. Additionally, in embodiments, the vehicle 100 may include one or more additional rows of seats behind the driver seat 104 and the passenger seat in the −Y direction.

The vehicle 100 includes a dashboard 108 provided in front of the driver seat 104 in the +Y direction from which a steering wheel 110 extends. In embodiments, a knee airbag module 112 is provided within the dashboard 108. The knee airbag module 112 includes an airbag housing 114, an inflator 116, and an airbag body 118 in fluid communication with the inflator 116. The airbag body 118 is formed from a thin, nylon fabric and folded within the airbag housing 114 when in a folded state. In some embodiments, the inflator 116 is communicatively coupled to a collision sensor 120. The collision sensor 120 determines or predicts an occurrence of a collision when a specific condition is satisfied. The collision sensor 120 then actuates the inflator 116. In some embodiments, the collision sensor 120 is communicatively coupled to an electronic control unit (ECU) 122 of the vehicle 100. In this instance, the collision sensor 120 sends environment data to the ECU 122 which makes a determination as to whether the inflator 116 should be actuated.

As described in more detail herein, when the collision sensor 120 or the ECU 122 determines whether the airbag body 118 of the knee airbag module 112 should inflate, the inflator 116 provides a gaseous reaction resulting in the production of nitrogen or other gases. Such reactions include, but are not limited to, sodium azide ($NaN_3$) reacting with potassium nitrate ($KNO_3$) to produce nitrogen gas. The nitrogen gas released from the inflator 116 is directed into the airbag body 118 to inflate the airbag body 118 from the folded state (FIG. 1A) to the deployed state (FIG. 1B). During inflation of the airbag body 118 towards the deployed state, as shown in FIG. 1B, a force of the airbag body 118 expanding pushes against a rupturable door in the dashboard 108 until it ruptures, which allows the airbag body 118 to expand outside of the dashboard 108 and in front of the driver 106 seated in the driver seat 104. Specifically, the knee airbag module 112 is oriented and positioned at a particular height within the interior cabin 102 of the vehicle 100 such that the airbag body 118 deploys toward a knee 109 of the driver 106 seated in the driver seat 104 prior to a collision, as shown in FIG. 1B.

Referring still to FIG. 1A, the vehicle 100 includes a footwell 124 provided below the dashboard 108 in the −Z direction and in front of the driver seat 104. As described in more detail herein, it should be appreciated that the footwell 124, or a separate footwell, may extend in front of the passenger seat as well, if provided. The footwell 124 defines an area in which the feet 107 of the driver 106 are received. The footwell 124 includes a lower floor panel 126, an upper floor panel 128, and a movable floor panel 130 positioned between the lower floor panel 126 and the upper floor panel 128. The lower floor panel 126 is fixed relative to the frame 101 of the vehicle 100 on which the driver seat 104 is positioned. The lower floor panel 126 includes a body 132 generally extending in the vehicle longitudinal direction. The body 132 of the lower floor panel 126 includes a forward end 134 and a rearward end 136 opposite the forward end 134. The rearward end 136 of the body 132 of the lower floor panel 126 is closer to the driver seat 104 than to the forward end 134. The upper floor panel 128 is similarly fixed to the frame 101 of the vehicle 100 and spaced apart from the lower floor panel 126. The movable floor panel is positioned between the lower floor panel 126 and the upper floor panel 128 to define the footwell 124. The upper floor panel 128, as described in more detail herein, includes a body 138 generally having an arcuate shape. The body 138 of the upper floor panel 128 includes a lower end 140 proximate the movable floor panel 130 and an upper end 142 opposite the lower end 140.

The movable floor panel 130 includes a body 144 having an upper end 146 and a lower end 148 opposite the upper end 146. In embodiments, the movable floor panel 130 is rotatably coupled to the frame 101 of the vehicle 100. In other embodiments, the movable floor panel 130 is rotatably coupled to the upper floor panel 128, particularly the lower end 140 of the upper floor panel 128. As shown, a floor pin 150 extends through the body 144 of the movable floor panel 130 and, in embodiments, the lower end 140 of the upper floor panel 128 to rotatably couple the movable floor panel 130 to the upper floor panel 128. The floor pin 150 defines a pivot point about which the movable floor panel 130 rotates relative to the upper floor panel 128 in the direction of arrow A. The movable floor panel 130 is movable between an extended position, as shown in FIG. 1A, and a retracted position, as shown in FIG. 1B. As described in more detail herein, the retracted position refers to a state of the movable floor panel 130 in which the upper end 146 and/or the lower end 148 of the movable floor panel 130 is moved in a forward vehicle longitudinal direction and/or a downward vehicle vertical direction away from the driver seat 104 relative to a position of the movable floor panel 130 when in the extended position.

In embodiments, the vehicle 100 includes an actuator 152 that controls a position of the movable floor panel 130. Specifically, in embodiments, the actuator 152 is communicatively coupled to the floor pin 150 or the body 144 of the movable floor panel 130 itself to move the movable floor panel 130 from the extended position to the retracted position. Specifically, the actuator 152 is operable to rotate the movable floor panel 130 from the extended position to the retracted position about the floor pin 150 in a direction depicted by arrow A. In embodiments, the actuator 152 rotates the floor pin 150, which rotates the movable floor panel 130 from the extended position to the retracted position. In other embodiments, the actuator 152 includes a hydraulic actuator, a pneumatic actuator, an electronic motor, a solenoid, or the like that is coupled to the body 144 of the movable floor panel 130 and retracts to pull the movable floor panel 130 from the extended position to the retracted position. In some embodiments, the floor pin 150 includes a portion that prevents the rotation of the movable floor panel 130 and, upon actuation of the actuator 152 the portion of the floor pin 150 is fractured to allow for the rotation of the movable floor panel 130. It should be appreciated that any other suitable mechanism for rotating the movable floor panel 130 is contemplated as being within the scope of the present disclosure.

It should be appreciated that during normal operation of the vehicle 100 in which a collision is not predicted or detected, the movable floor panel 130 is in the extended position between the lower floor panel 126 and the upper floor panel 128. As described in more detail herein, when the collision sensor 120 determines or predicts an occurrence of a collision, the actuator 152 receives a signal from the collision sensor 120 or the ECU 122 of the vehicle 100 to move the movable floor panel 130 from the extended position to the retracted position, as shown in FIG. 1B. In doing so, the movable floor panel 130 rotates about the floor pin 150 in the direction arrow A to increase a space between the movable floor panel 130 and the foot 107 of the driver 106.

In embodiments, the vehicle 100 includes a pedal assembly 154 that is configured to move out of the way of the foot 107 of the driver 106 prior to or during a collision. It should be appreciated that the pedal assembly 154 is applicable to either a brake pedal and/or an accelerator pedal. Accordingly, although only one pedal assembly 154 is depicted in the drawings, the vehicle 100 may include a pair of pedal assemblies 154 arranged in the vehicle lateral direction, one for a brake pedal and one for an accelerator pedal, which may have similar structure.

As shown in FIG. 1A, the pedal assembly 154 includes an upper pedal arm 156 pivotally connected to the upper floor panel 128, a lower pedal arm 158 pivotally connected to the upper pedal arm 156, and a pedal pad 160 provided on the lower pedal arm 158. The upper pedal arm 156 includes an upper end 162 and a lower end 163 opposite the upper end 162. As shown in FIG. 1A, the upper end 162 of the upper pedal arm 156 is pivotally connected to the upper floor panel 128 proximate the upper end 142 of the upper floor panel 128. However, it should be appreciated that the upper pedal arm 156 may be pivotally connected to the upper floor panel 128 at any suitable location or to any other suitable structure of the vehicle 100. In embodiments, an upper pedal pin 164 extends through the upper pedal arm 156 and the upper floor panel 128 to rotatably couple the upper pedal arm 156 to the upper floor panel 128. The upper pedal pin 164 defines a pivot point about which the upper pedal arm 156 rotates relative to the upper floor panel 128. As described herein, the upper pedal arm 156 is permitted to rotate relative to the upper floor panel 128 about the upper pedal pin 164 in a direction depicted by arrow B.

The lower pedal arm 158 is rotatably connected to the upper pedal arm 156. Specifically, the lower pedal arm 158 includes an upper end 166 and a lower end 168 opposite the upper end 166. As shown in FIG. 1A, the upper end 166 of the lower pedal arm 158 is pivotally connected to the lower end 163 of the upper pedal arm 156. However, it should be appreciated that the lower pedal arm 158 may be pivotally connected to the upper pedal arm 156 at any suitable location. In embodiments, a lower pedal pin 170 extends through the lower pedal arm 158 and the upper pedal arm 156 to rotatably couple the lower pedal arm 158 to the upper pedal arm 156. The lower pedal pin 170 defines a pivot point about which the lower pedal arm 158 rotates relative to the upper pedal arm 156 in the direction of arrow C. As described in more detail herein, rotation of the upper pedal arm 156 relative to the upper floor panel 128 may be inhibited prior to a detection or prediction of a collision. As such, the rotation of the lower pedal arm 158 relative to the upper pedal arm 156 allows for the driver 106 to depress the pedal pad 160 to control the acceleration and/or deceleration of the vehicle 100.

The lower pedal arm 158 also includes a front surface 172 facing a rearward vehicle direction (−Y direction) and a rear surface 174 opposite the front surface 172 facing a forward vehicle direction (+Y direction). The pedal pad 160 is mounted to the front surface 172 of the lower pedal arm 158 and contacted by a foot 107 of the driver 106. As described herein, the pedal assembly 154 may be associated with a brake pedal or an accelerator pedal. Accordingly, in embodiments in which the pedal assembly 154 is associated with a brake pedal, the driver 106 applies a force against the pedal pad 160, which rotates the lower pedal arm 158 about the lower pedal pin 170 in a direction depicted by arrow C, to decrease a speed of the vehicle 100. In alternative embodiments in which the pedal assembly 154 is associated with an accelerator pedal, the driver 106 applies a force against the pedal pad 160, which rotates the lower pedal arm 158 about the lower pedal pin 170 in the direction of arrow C, to increase the speed of the vehicle 100. When the force applied against the pedal pad 160 by the driver 106 is discontinued, the lower pedal arm 158 rotates back in a direction opposite the direction of arrow C.

Figure 1C:
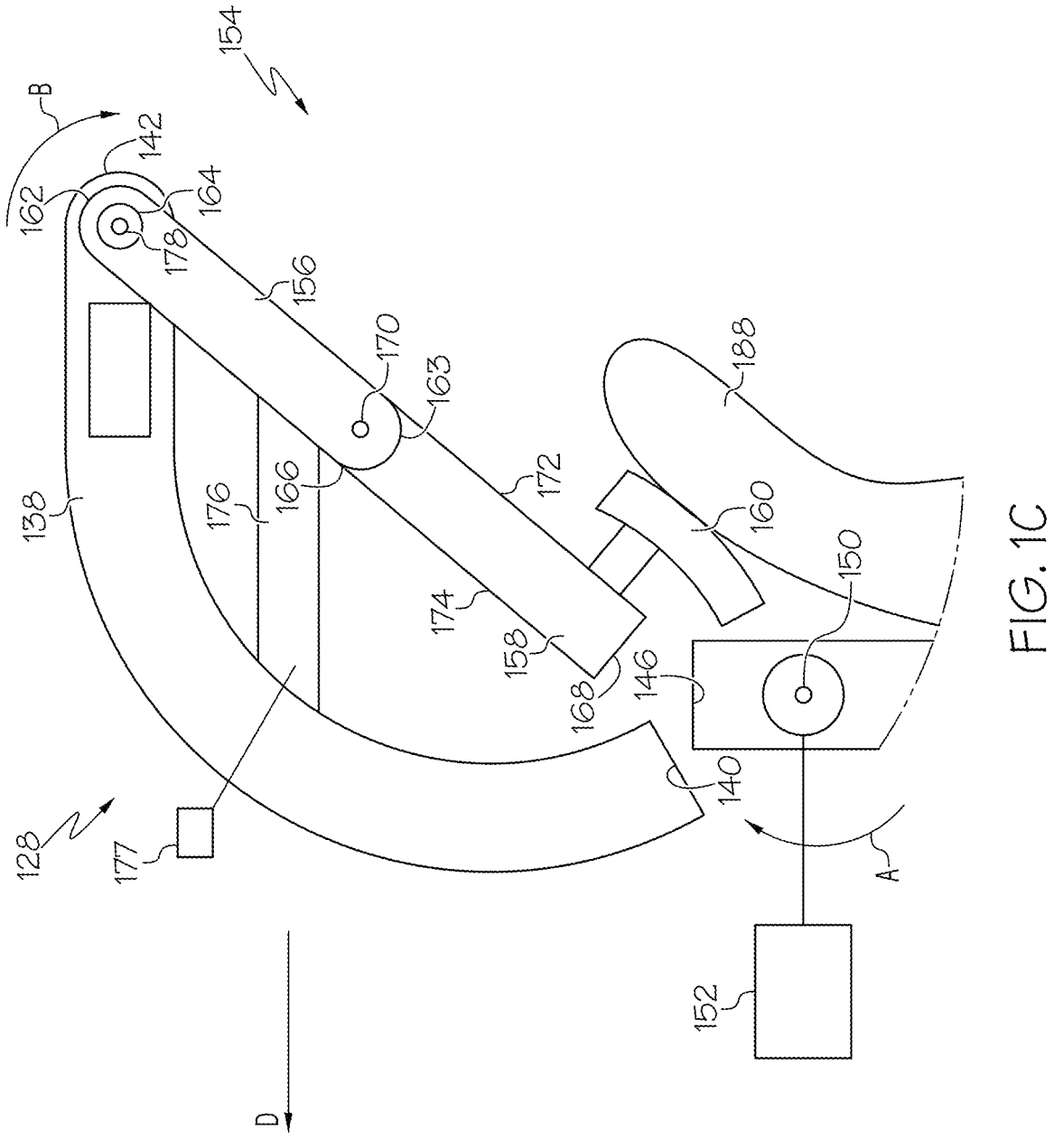
FIG. 1C schematically depicts an enlarged view of circle 1C taken from FIG. 1B, according to one or more embodiments shown and described herein.

In embodiments, a pedal actuator 176 extends between the upper floor panel 128 and the upper pedal arm 156. The pedal actuator 176 is communicatively coupled to the collision sensor 120 or the ECU 122. As described in more detail herein, the pedal actuator 176 is operated to move the pedal assembly 154 from the extended position, as shown in FIG. 1A, to the retracted position, as shown in FIGS. 1B and 1C. Specifically, the pedal actuator 176 is operated to translate in a direction depicted by arrow D to rotate the upper pedal arm 156 about the upper pedal pin 164 in the direction of arrow B. In embodiments, the pedal actuator 176 includes a hydraulic actuator, a pneumatic actuator, a pyrotechnic actuator, a solenoid, or the like. In embodiments, the pedal actuator 176 inhibits rotation of the upper pedal arm 156 relative to the upper floor panel 128 prior to a detection or prediction of a collision. In embodiments in which the pedal actuator 176 is a pyrotechnic actuator, a pyrotechnic actuator controller 177 may be communicatively coupled to the pyrotechnic actuator and the collision sensor 120. In response to the pyrotechnic actuator controller 177 receiving a signal from the collision sensor 120, or the ECU 122, the pyrotechnic actuator controller 177 operates the pyrotechnic actuator to translate in the direction of arrow D and move the upper pedal arm 156 from the extended position to the retracted position. In embodiments, the pyrotechnic actuator controller 177 is the ECU 122.

In other embodiments, the pedal actuator 176 includes a biasing member that continually applies a force on the upper pedal arm 156 to rotate the upper pedal arm 156 in the direction of arrow B. In such embodiments, the upper pedal pin 164 includes a shear pin 178 that inhibits rotation of the upper pedal arm 156 relative to the upper floor panel 128 in the direction of arrow B. However, upon the shear pin 178 detaching from the upper pedal arm 156, the force applied by the pedal actuator 176 causes the upper pedal arm 156 to rotate in the direction of arrow B. In embodiments, the pedal assembly includes a shear pin controller 180 communicatively coupled to the collision sensor 120 or the ECU 122. The shear pin controller 180 is configured to cause the shear pin 178 to shear from the upper pedal arm 156 and permit the upper pedal arm 156 to rotate upon a signal being received from the collision sensor 120 or the ECU 122. In embodiments, the shear pin controller 180 includes an actuator, torque limiter, shock relay, pyrotechnic device, or the like.

It should be appreciated that during normal operation of the vehicle 100 in which a collision is not predicted or detected, the pedal assembly 154 is in the extended position, as shown in FIG. 1A. As described in more detail herein, in embodiments, when the collision sensor 120 determines or predicts an occurrence of a collision, the pedal actuator 176 receives a signal from the collision sensor 120 or the ECU 122 of the vehicle 100 to move the pedal assembly 154 from the extended position to the retracted position, as shown in FIGS. 1B and 1C. In doing so, the pedal actuator 176 translates in the direction of arrow D, which rotates the upper pedal arm 156 relative to the upper floor panel 128 in the direction of arrow B. In other embodiments, when the collision sensor 120 determines or predicts an occurrence of a collision, the shear pin controller 180 receives a signal from the collision sensor 120 or the ECU 122 of the vehicle 100 to permit the upper pedal arm 156 to rotate relative to the upper floor panel in the direction of arrow B. In doing so, the shear pin controller 180 causes the shear pin 178 to shear from the upper pedal arm 156, which permits the upper pedal arm 156 to rotate in the direction of arrow B as a result of force from the pedal actuator 176 translating in the direction of arrow D.

Referring still to FIG. 1A, in embodiments, a foot airbag module 182 is provided below the lower floor panel 126. However, as shown in FIG. 1A, a second location of the foot airbag module 182 is depicted in dashed lines to illustrate alternative positioning for the foot airbag module 182 closer to a forward end of the vehicle 100. It should be appreciated that the foot airbag module 182 may be positioned in any suitable location other than that depicted herein. The foot airbag module 182 includes an airbag housing 184, an inflator 186, and an airbag body 188 in fluid communication with the inflator 186. The airbag body 188 is formed from a thin, nylon fabric and folded within the airbag housing 184 when in a folded state. In some embodiments, the inflator 186 is communicatively coupled to the collision sensor 120, which actuates the inflator 186 in response to determining or predicting an occurrence of a collision. The foot airbag module 182 is separate from the knee airbag module 112 such that the airbag body 188 of the foot airbag module 182 is independent of the airbag body 118 of the knee airbag module 112.

As described in more detail herein, when the collision sensor 120 or the ECU 122 determines the airbag body 188 of the foot airbag module 182 should inflate, the inflator 186 provides a gaseous reaction resulting in the production of nitrogen or other gases. The nitrogen gas released from the inflator 186 is directed into the airbag body 188 to inflate the airbag body 188 from the folded state (FIG. 1A) to the deployed state (FIG. 1B). During inflation towards the deployed state, as shown in FIG. 1B, the airbag body 188 expands into the footwell 124 in front of the driver 106 seated in the driver seat 104. Specifically, as shown in FIG. 1B, with the movable floor panel 130 in the retracted position, a space 190 is provided between the lower end 148 of the movable floor panel 130 and the forward end 134 of the lower floor panel 126. When the movable floor panel 130 is in the retracted position, the space 190 allows for the foot 107 to extend farther forward in the vehicle longitudinal direction than when the movable floor panel 130 is in the extended position. Accordingly, the foot airbag module 182 is oriented such that the airbag body 188 deploys through the space 190 and between the foot 107 of the driver 106, the movable floor panel 130, and the pedal assembly 154 while in the retracted position. In addition, the airbag body 188 is configured to deploy to at least a location previously occupied by the movable floor panel 130 when in the extended position. It should be appreciated that during a collision occurrence, inertia may cause the feet 107 of the driver 106 to move in a moving direction of the vehicle 100 as depicted by arrow F. Accordingly, the foot 107 of the driver 106, and particularly a heel of the foot 107, is shown flush against the airbag body 188.

Figure 2A:
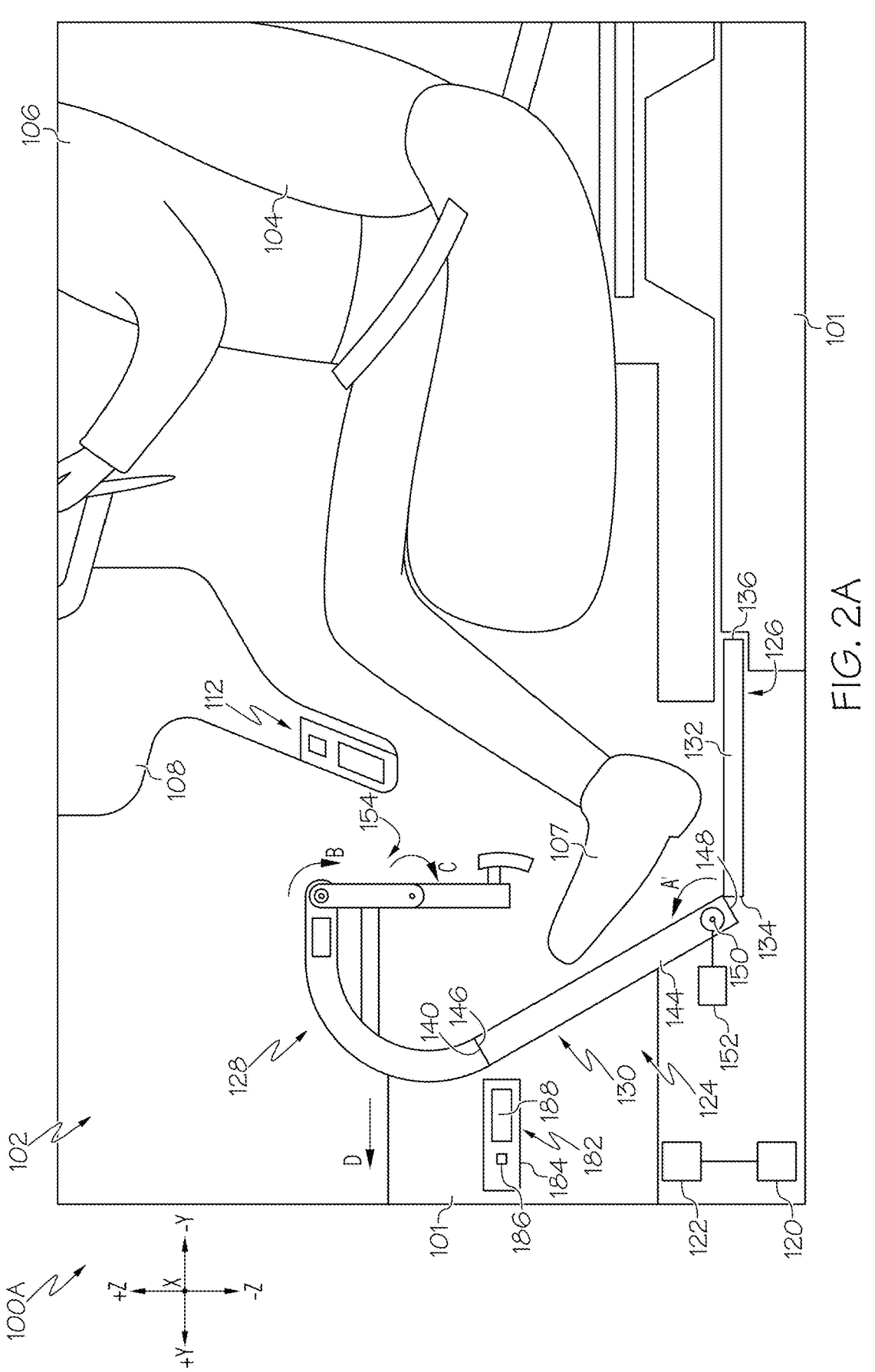
FIG. 2A schematically depicts a partial side view of another embodiment of a vehicle including the footwell having components illustrated in an extended position, according to one or more embodiments shown and described herein.
Figure 2B:
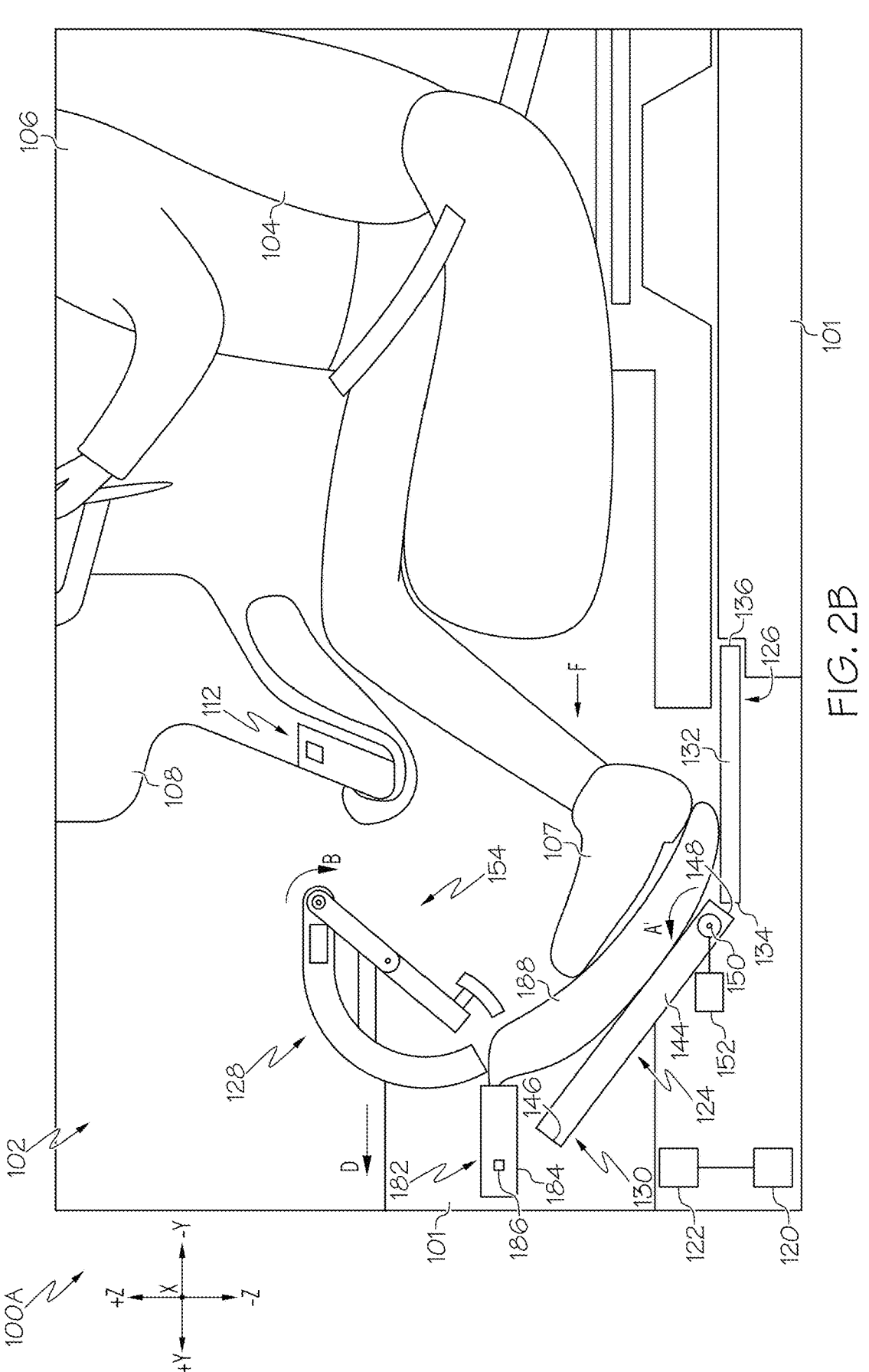
FIG. 2B schematically depicts a partial side view of the vehicle of FIG. 2A illustrating the components of the footwell in a retracted position, according to one or more embodiments shown and described herein.

Referring now to FIGS. 2A and 2B, a partial view of a vehicle 100A is illustrated according to one or more embodiments described herein. The vehicle 100A includes similar structure to the vehicle 100 described herein and illustrated in FIGS. 1A-1C. However, contrary to the vehicle 100 in which the floor pin 150 is provided at the upper end 146 of the movable floor panel 130, the floor pin 150 of the movable floor panel 130 of the vehicle 100A is provided at the lower end 148 of the movable floor panel 130. Accordingly, the movable floor panel 130 rotates about the floor pin 150 in the direction of arrow A' from the extended position, shown in FIG. 2A, to the retracted position, shown in FIG. 2B.

Additionally, due to the movable floor panel 130 rotating relative to the lower floor panel 126, a space is formed between the upper end 146 of the movable floor panel 130 and the lower end 140 of the upper floor panel 128. Thus, the foot airbag module 182 is repositioned such that the airbag body 188 extends through the space between the upper end 146 of the movable floor panel 130 and the lower end 140 of the upper floor panel 128 when the movable floor panel 130 is in the retracted position and the airbag body 188 is in the deployed position, as shown in FIG. 2B.

Figure 3A:
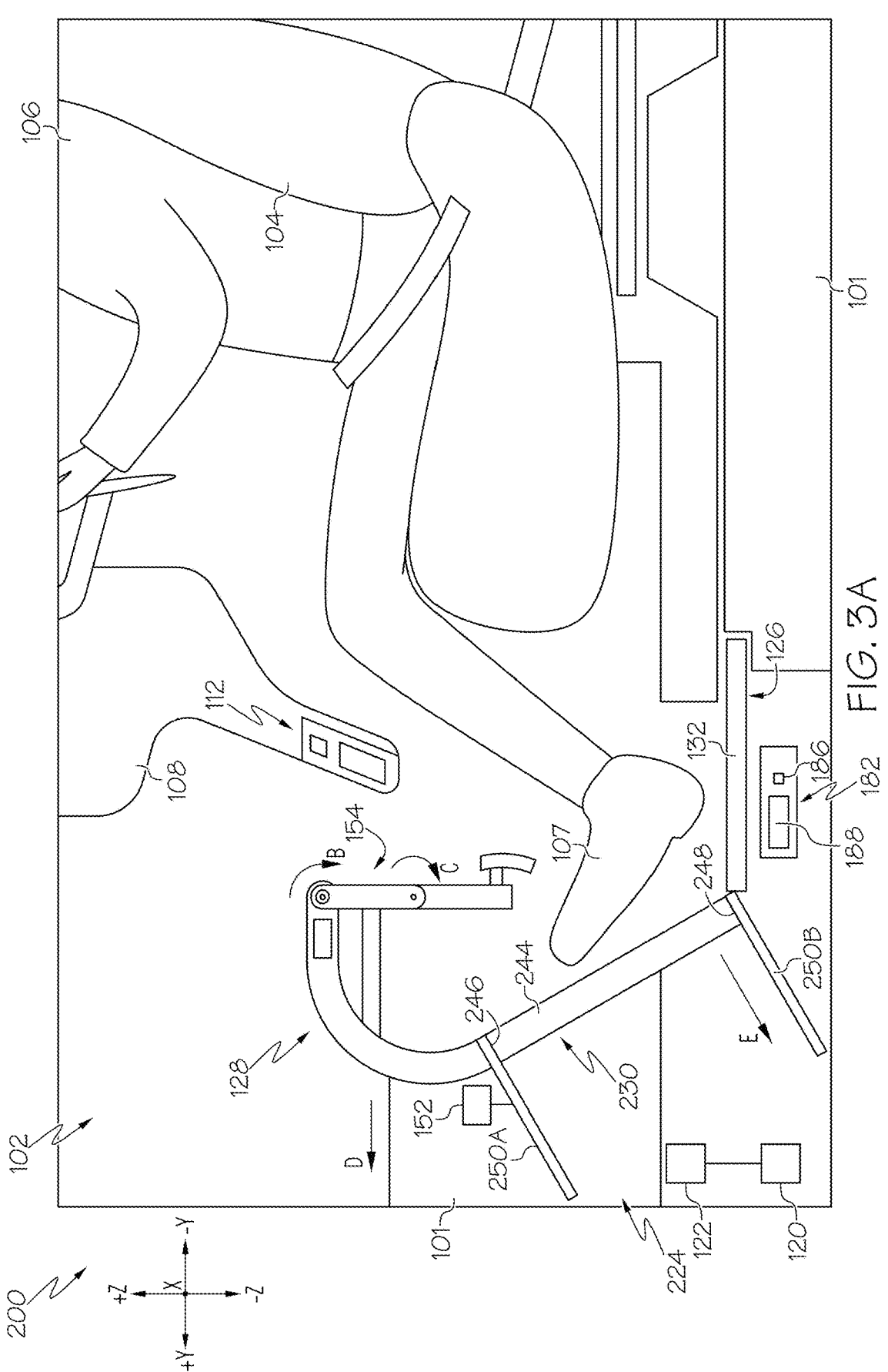
FIG. 3A schematically depicts a partial side view of another embodiment of a vehicle including a footwell having components illustrated in an extended position, according to one or more embodiments shown and described herein.
Figure 3B:
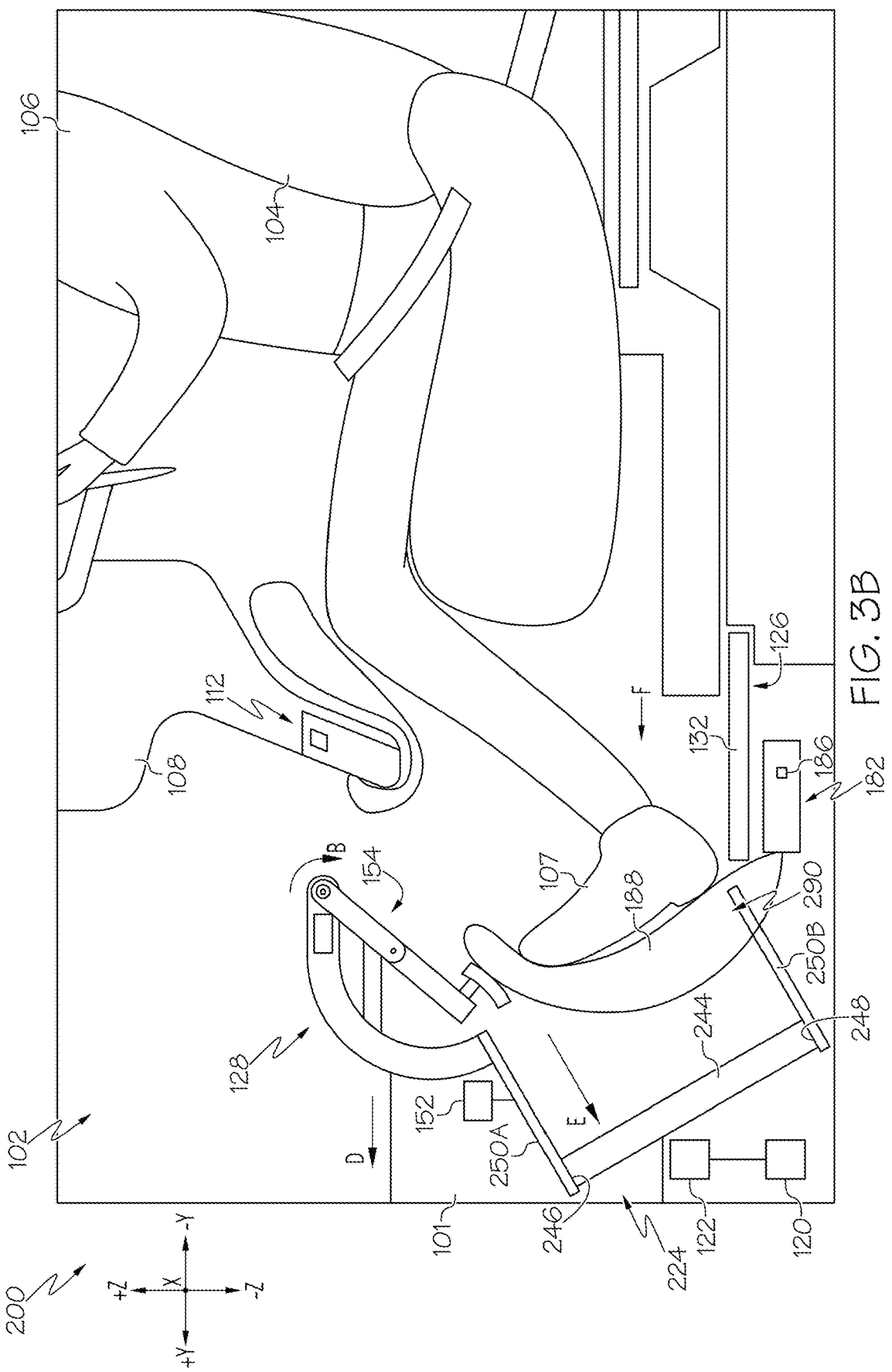
FIG. 3B schematically depicts a partial side view of the vehicle of FIG. 3A illustrating the components of the footwell in a retracted position, according to one or more embodiments shown and described herein.

Referring now to FIGS. 3A and 3B, a partial view of a vehicle 200 is illustrated according to one or more embodiments described herein. The vehicle 200 of FIGS. 3A and 3B is similar to the vehicle 100 of FIGS. 1A and 1B. As such, like reference numbers will be used to refer to like parts. The vehicle 200 includes the driver seat 104 provided within an interior cabin 102 in which a driver 106 may be seated in. The vehicle 200 includes the dashboard 108 including the knee airbag module 112 positioned to deploy toward the knee 109 of the driver 106 seated in the driver seat 104. The vehicle 200 includes a footwell 224 including the lower floor panel 126, the upper floor panel 128, a movable floor panel 230, and the pedal assembly 154 coupled to the upper floor panel 128 of the footwell 224.

The movable floor panel 230 includes a body 244 having an upper end 246 and a lower end 248 opposite the upper end 246. In embodiments, one or more rails 250A, 250B are provided to facilitate translation of the body 244 of the movable floor panel 230 between an extended position, as shown in FIG. 3A, and a retracted position, as shown in FIG. 3B. As shown, an upper rail 250A is provided proximate the upper floor panel 128, and a lower rail 250B is provided proximate the lower floor panel 126. The upper rail 250A and the lower rail 250B each extends substantially in the vehicle longitudinal direction. The upper end 246 of the body 244 of the movable floor panel 230 engages the upper rail 250A, and the lower end 248 of the body 244 of the movable floor panel 230 engages the lower rail 250B. In embodiments, the vehicle 200 includes only the upper rail 250A engaging the upper end 246 of the body 244 of the movable floor panel 230. In other embodiments, the vehicle 200 includes only one of the upper rail 250A engaging the upper end 246 of the body 244 of the movable floor panel 230 or the lower rail 250B engaging the lower end 248 of the body 244 of the movable floor panel 230.

In embodiments, the actuator 152 is configured to move the movable floor panel 230 from the extended position, as shown in FIG. 3A, to the retracted position, as shown in FIG. 3B, upon control from the ECU 122. Prior to the prediction or detection of a collision by the collision sensor 120, the actuator 152 retains the movable floor panel 230 in the extended position. Upon the prediction or detection of a collision by the collision sensor 120, the ECU 122 controls the actuator 152 to move the movable floor panel 230 from the extended position to the retracted position in the direction of arrow E. The actuator 152 may include a hydraulic actuator, a pneumatic actuator, an electronic motor, a solenoid, or the like.

In embodiments in which both the upper rail 250A and the lower rail 250B are provided, at least one of the upper rail 250A and the lower rail 250B include threaded drive rods that engage a nut provided at a respective one of the upper end 246 or the lower end 248 of the body 244 of the movable floor panel 230. Accordingly, rotation of the threaded drive rods of the upper rail 250A or the lower rail 250B results in the body 244 of the movable floor panel 230 translating along the upper rail 250A and the lower rail 250B from the extended position to the retracted position in a direction depicted by arrow E. In embodiments, only one of the upper rail 250A and the lower rail 250B includes a threaded drive rod while the other of the upper rail 250A and the lower rail 250B merely guides the body 244 of the movable floor panel 230 during translation.

In embodiments, the actuator 152 is provided for operating controlling a position of the movable floor panel 230. In embodiments, the actuator 152 is operated to rotate the threaded drive rod of the upper rail 250A and/or the lower rail 250B. In other embodiments, the actuator 152 operates the actuator that translates the body 244 of the movable floor panel 230 in the direction of arrow E and into the retracted position.

It should be appreciated that during normal operation of the vehicle 200 in which a collision is not predicted or detected, the movable floor panel 230 is in the extended position between the lower floor panel 126 and the upper floor panel 128. As described in more detail herein, when the collision sensor 120 determines or predicts an occurrence of a collision, the actuator 152 receives a signal from the collision sensor 120 or the ECU 122 of the vehicle 200 to move the movable floor panel 230 from the extended position to the retracted position, as shown in FIG. 3B. In doing so, the movable floor panel 230 translates along the upper rail 250A and the lower rail 250B in the direction arrow E.

Referring still to FIG. 3A, in embodiments, the foot airbag module 182 is provided below the lower floor panel 126. During inflation towards the deployed state, as shown in FIG. 3B, the airbag body 188 expands into the footwell 224 in front of the driver 106 seated in the driver seat 104. Specifically, as shown in FIG. 3B, with the movable floor panel 230 in the retracted position, a space 290 is provided between the lower end 248 of the body 244 of the movable floor panel 230 and the forward end 134 of the body 132 of the lower floor panel 126. When the movable floor panel 230 is in the retracted position, the space 290 allows for the foot 107 to extend farther forward in the vehicle longitudinal direction than when the movable floor panel 230 is in the extended position. Accordingly, the foot airbag module 182 is oriented such that the airbag body 188 deploys through the space 290 and between the foot 107 of the driver 106, the movable floor panel 230, and the pedal assembly 154 while in the retracted position.

Figure 4:
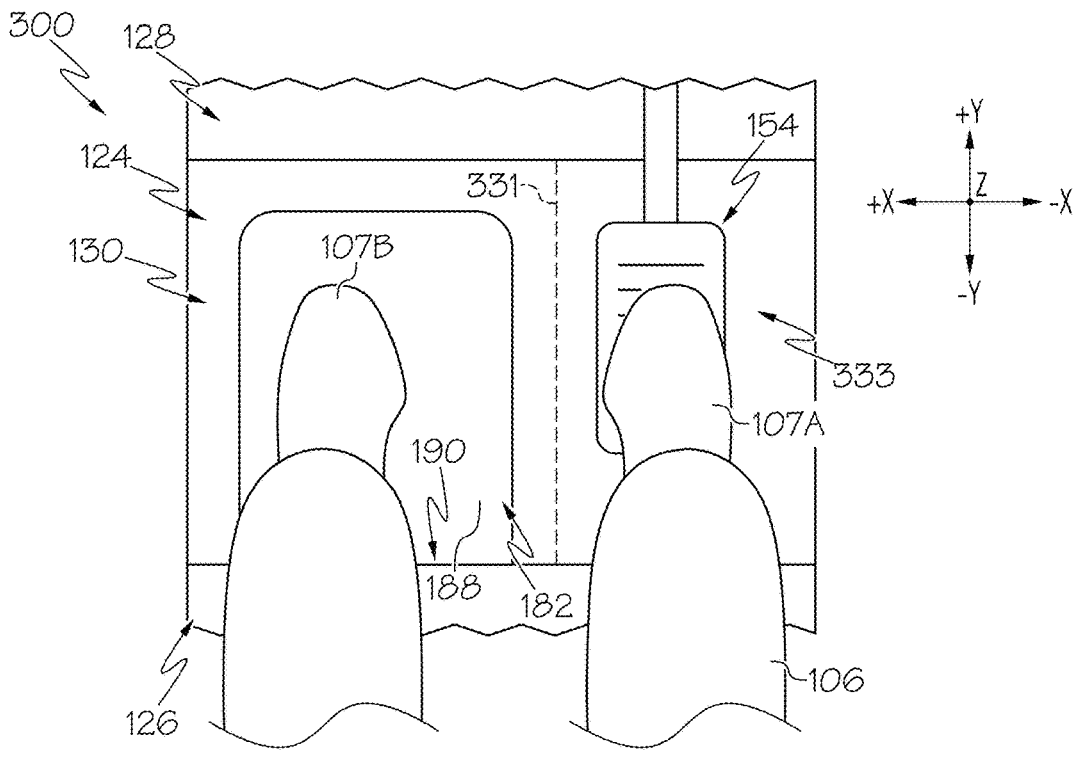
FIG. 4 schematically depicts a partial top view of another embodiment of a vehicle illustrating a movable floor panel and an airbag body of a footwell extending below a left foot of a driver, according to one or more embodiments shown and described herein.

Referring now to FIG. 4, a partial top view of the driver 106 is shown within a vehicle 300. A right foot 107A and a left foot 107B of the driver 106 are depicted extending within the footwell 124 of the vehicle 300. The right foot 107A is positioned in front of the pedal assembly 154, as depicted as a brake pedal in FIG. 4, and the left foot 107B is positioned next to the pedal assembly 154. Although reference is made to the footwell 124 described herein and illustrated in FIGS. 1A and 1B, it should be appreciated that the following description is equally applicable to embodiments including the footwell 124 and the footwell 224 described herein and illustrated in FIGS. 2A-3B. As described herein, the footwell 124 includes the lower floor panel 126, the upper floor panel 128, and the movable floor panel 130 provided therebetween.

As shown in FIG. 4, a delineation line 331 extends between the lower floor panel 126 and the upper floor panel 128 to separate the movable floor panel 130 from a fixed intermediate floor panel 333 also extending between the lower floor panel 126 and the upper floor panel 128. The fixed intermediate floor panel 333 is positioned adjacent to the movable floor panel 130 in the −X direction. The fixed intermediate floor panel 333 remains stationary relative to the lower floor panel 126 and the upper floor panel 128. Thus, when the movable floor panel 130 moves from the extended position to the retracted position, the fixed intermediate floor panel 333 remains fixed. The delineation line 331 is positioned between the right foot 107A and the left foot 107B of the driver 106. Accordingly, as the movable floor panel 130 only extends along the +/−X axis below the left foot 107B of the driver 106, only a portion of the footwell 124 below the left foot 107B of the driver 106 is movable from the extended position to the retracted position. Additionally, in such embodiments, the airbag body 188 of the foot airbag module 182 deploys through the space 190 formed between the lower floor panel 126 and the movable floor panel 130 when the movable floor panel 130 is in the retracted position to permit the airbag body 188 of the foot airbag module 182 to inflate below the left foot 107B of the driver 106.

Figure 5:
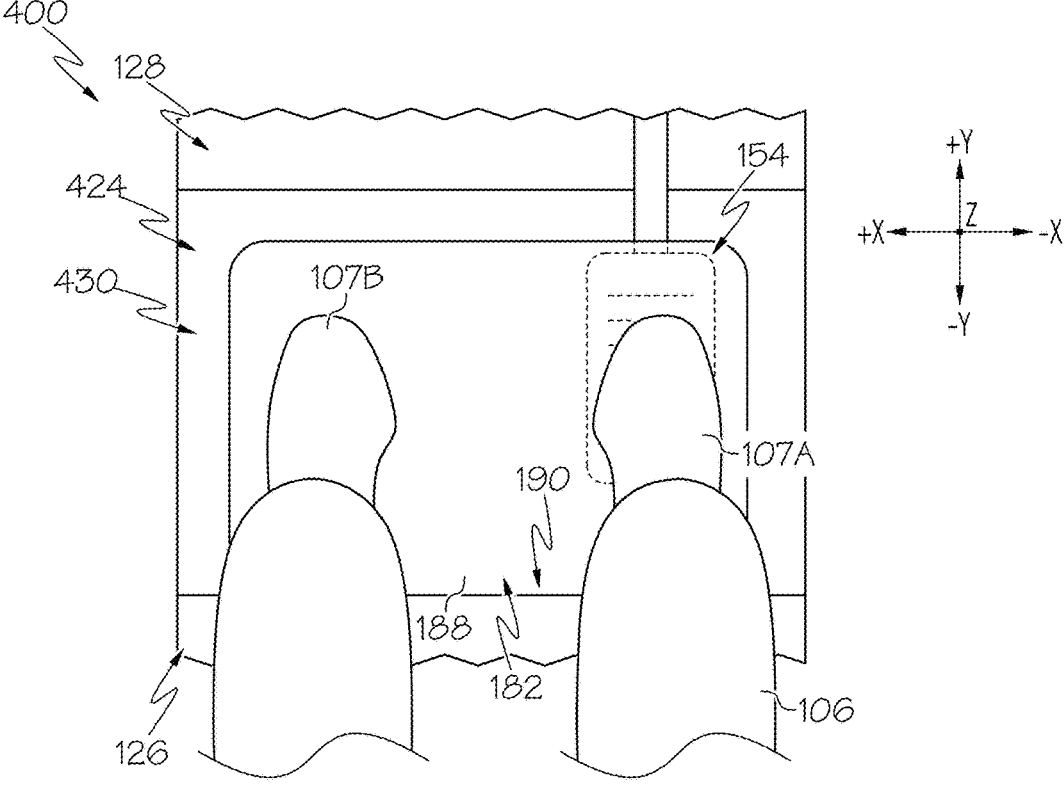
FIG. 5 schematically depicts a partial top view of another embodiment of a vehicle illustrating a movable floor panel and an airbag body of a footwell extending below a left foot and a right foot of a driver, according to one or more embodiments shown and described herein.

Referring now to FIG. 5, a partial top view of the driver 106 is shown within another embodiment of a vehicle 400. Similar to FIG. 4, the right foot 107A and the left foot 107B of the driver 106 are depicted extending within a footwell 424 of the vehicle 400. The right foot 107A is positioned in front of the pedal assembly 154, as depicted as a brake pedal in FIG. 5, and the left foot 107B is positioned next to the pedal assembly 154. The footwell 424 is similar to the footwell 124 and, thus, like reference numbers are used to refer to like parts. Accordingly, the footwell 424 includes the lower floor panel 126, the upper floor panel 128, and a movable floor panel 430 provided therebetween.

The movable floor panel 430 is similar in structure to the movable floor panel 130 described herein and illustrated in FIGS. 1A, 1B, and 3. However, contrary to the movable floor panel 130, as depicted in FIG. 4 in which the movable floor panel 130 only extends along the +/−X axis below only the left foot 107B of the driver 106, the movable floor panel 430 extends along the +/−X axis below each of the right foot 107A and the left foot 107B of the driver 106. Accordingly, the movable floor panel 430 extending along the +/−X axis below each of the right foot 107A and the left foot 107B of the driver 106 is movable from the extended position to the retracted position. Additionally, in such embodiments, the airbag body 188 of the foot airbag module 182 deploys through the space 190 formed between the lower floor panel 126 and the movable floor panel 430 when the movable floor panel 430 is in the retracted position to permit the airbag body 188 of the foot airbag module 182 to inflate below each of the right foot 107A and the left foot 107B of the driver 106. Accordingly, the pedal assembly 154 is depicted in dashed lines behind the airbag body 188. Additionally, it should be appreciated that the above description is equally applicable to the movable floor panel 430 including structure similar to the movable floor panel 230 (FIG. 3B), which translates instead of pivots.

Figure 6:
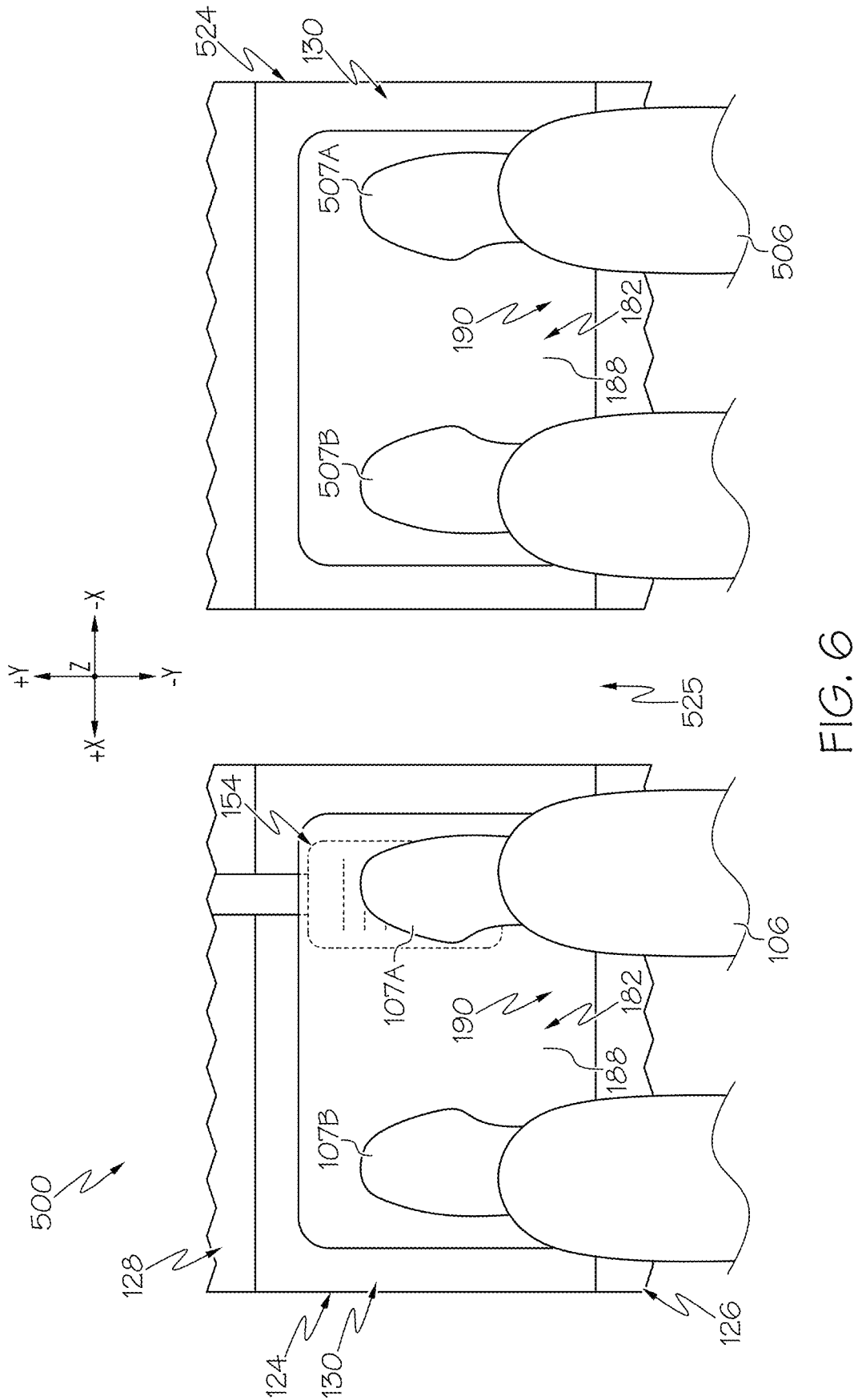
FIG. 6 schematically depicts a partial top view of another embodiment of a vehicle illustrating a movable floor panel and an airbag body of a footwell extending below a left foot and a right foot of a driver, and a movable floor panel and an airbag body of a front passenger footwell extending below a left foot and a right foot of a passenger, according to one or more embodiments shown and described herein.

Referring now to FIG. 6, a partial top view of the driver 106 and a front passenger 506 is shown within another embodiment of a vehicle 500. As shown, the vehicle 500 includes the footwell 124 in which the right foot 107A and the left foot 107B of the driver 106 are positioned, and a passenger footwell 524 in which a right foot 507A and a left foot 507B of a front passenger 506 are positioned. In embodiments, the footwell 124 and the passenger footwell 524 are joined to one another to continuously extend along the +/−X axis. In other embodiments, as depicted in FIG. 6, the footwell 124 and the passenger footwell 524 are separate from one another and a gap 525 is provided between the footwell 124 and the passenger footwell 524 in the +/−X axis.

As described herein and illustrated in FIGS. 4-6, the footwell 124 includes the foot airbag module 182 including the airbag body 188. The movable floor panel 130 of the footwell 124 extends below the right foot 107A and the left foot 107B of the driver. As such, the airbag body 188 of the foot airbag module 182 deploys through the space 190 formed between the lower floor panel 126 and the movable floor panel 130 when the movable floor panel 130 is in the retracted position to permit the airbag body 188 of the foot airbag module 182 to inflate below each of the right foot 107A and the left foot 107B of the driver 106. Accordingly, the pedal assembly 154 is depicted in dashed lines behind the airbag body 188.

Similar to the footwell 124, the passenger footwell 524 includes similar structure to the footwell 124 with the exception of the pedal assembly 154. Accordingly, like reference numbers will be used to refer to like parts. Specifically, the movable floor panel 130 of the passenger footwell 524 extends below the right foot 507A and the left foot 507B of the front passenger 506. Additionally, when the movable floor panel 130 of the passenger footwell 524 is in the retracted position, the airbag body 188 of the foot airbag module 182 of the passenger footwell 524 deploys through the space 190 formed between the lower floor panel 126 and the movable floor panel 130. Thus, the airbag body 188 of the foot airbag module 182 inflates below each of the right foot 507A and the left foot 507B of the front passenger 506 within the passenger footwell 524.

Figure 7:
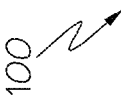
FIG. 7 schematically depicts electrical components of the vehicle of FIG. 1A, according to one or more embodiments shown and described herein.

Referring now to FIG. 7, components of the vehicle 100 are schematically depicted. However, it should be appreciated that the description of each of the components is equally applicable to other embodiments of the vehicles described herein, such as vehicles 100A, 200, 300, 400, and 500. In embodiments, the vehicle 100 includes the ECU 122, the collision sensor 120, the actuator 152, the pedal actuator 176, and the inflator 186 of the foot airbag module (FIG. 1A). The vehicle 100 further includes a communication path 600 communicatively coupling the ECU 122, the collision sensor 120, the actuator 152, the pedal actuator 176, and the inflator 186. In embodiments, as described herein, the vehicle 100 includes a shear pin controller 180, which, if provided, is communicatively coupled to the other components of the vehicle 100 via the communication path 600. The various components of the vehicle 100 and the interaction thereof will be described in more detail herein.

Still referring to FIG. 7, the communication path 600 may be formed from any medium that may be capable of transmitting a signal such as, for example, conductive wires, conductive traces, optical waveguides, or the like. Moreover, the communication path 600 may be formed from a combination of mediums capable of transmitting signals. In one embodiment, the communication path 600 comprises a combination of conductive traces, conductive wires, connectors, and buses that cooperate to permit the transmission of electrical data signals to components such as processors, memories, sensors, input devices, output devices, and communication devices. Accordingly, the communication path 600 may comprise a bus. Additionally, it is noted that the term "signal" may mean a waveform (e.g., electrical, optical, magnetic, mechanical or electromagnetic), such as DC, AC, sinusoidal-wave, triangular-wave, square-wave, vibration, and the like, capable of traveling through a medium. The communication path 600 communicatively couples the various components of the vehicle 100. As used herein, the term "communicatively coupled" means that coupled components are capable of exchanging data signals with one another such as, for example, electrical signals via conductive medium, electromagnetic signals via air, optical signals via optical waveguides, and the like.

The ECU 122 includes a processor 122A and a memory module 122B. The processor 122A may be any device capable of executing machine-readable instructions. Accordingly, the processor 122A may be a controller, an integrated circuit, a microchip, a computer, or any other computing device. The processor 122A may be communicatively coupled to the other components of the vehicle 100 by the communication path 600. Accordingly, the communication path 600 may communicatively couple any number of processors 122A with one another, and allow the components coupled to the communication path 600 to operate in a distributed computing environment. Specifically, each of the components may operate as a node that may send and/or receive data. While the embodiment depicted in FIG. 7 includes a single processor 122A, other embodiments may include more than one processor 122A.

Still referring to FIG. 7, the memory module 122B of the vehicle 100 may be coupled to the communication path 600 and communicatively coupled to the processor 122A. The memory module 122B may comprise RAM, ROM, flash memories, hard drives, or any non-transitory memory device capable of storing machine-readable instructions such that the machine-readable instructions can be accessed and executed by the processor 122A. The machine-readable instructions may comprise logic or algorithm(s) written in any programming language of any generation (e.g., 1GL, 2GL, 3GL, 4GL, or 5GL) such as, for example, machine language that may be directly executed by the processor 122A, or assembly language, object-oriented programming (OOP), scripting languages, microcode, etc., that may be compiled or assembled into machine-readable instructions and stored in the memory module 122B. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 7 includes a single memory module 122B, other embodiments may include more than one memory module 122B.

As described herein, the collision sensor 120 is communicatively coupled to the ECU 122 via the communication path 600. The collision sensor 120 is configured to detect and predict potential collisions using a combination of advanced sensor technologies. The collision sensor 120 may include various types of sensors, such as ultrasonic sensors, millimeter-wave radar, lidar, cameras, and the like, to monitor a surrounding of the vehicle 100. Upon detecting a potential hazard, the collision sensor 120 transmits real-time data to the ECU 122 via the communication path 600. The ECU 122 then processes the data received from the collision sensor 120 to assess a likelihood of a collision. If a collision is deemed imminent or detected, the ECU 122, or the collision sensor 120 directly, transmits a signal to one or more components of the vehicle 100.

For example, and with reference to FIGS. 1B-2B, when a collision is deemed imminent or detected, the ECU 122 transmits a signal to the actuator 152 to rotate the movable floor panel 130 into the retracted position, as shown in FIG. 1B. In other embodiments, the ECU 122 transmits a signal to the actuator 152 to translate the movable floor panel 230 into the retracted position, as shown in FIG. 3B. In embodiments, the ECU 122 transmits a signal to the sheer pin controller 180, when provided, to permit rotation of the upper pedal arm 156 in the direction of arrow B and further transmits a signal to the pedal actuator 176 to rotate the pedal assembly 154 into the retracted position, as shown in FIG. 1B. In embodiments, the ECU 122 transmits a signal to the foot airbag module 182 to deploy the airbag body 188 into the footwell 124 between the space 190 formed by the movable floor panel 130 in the retracted position and the lower floor panel 126, as shown in FIG. 1B. In embodiments, the ECU 122 transmits a signal to the foot airbag module 182 subsequent to signals being transmitted to the actuator 152, the sheer pin controller 180, and the pedal actuator 176 to ensure that space is provided within the footwell 124 to receive the airbag body 188 of the foot airbag module 182.

From the above, it is to be appreciated that defined herein is a footwell including a lower floor panel, a movable floor panel extending from the lower floor panel, and an actuator. The actuator is operable to move the movable floor panel from an extended position to a retracted position in response to an occurrence of a collision being determined or predicted based upon environment data collected by a collision sensor. Accordingly, during a front end vehicle collision, a space within the footwell that receives the feet of the driver is maintained.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A footwell comprising:
a lower floor panel defining a portion of an interior cabin;
a movable floor panel extending from the lower floor panel; and
an actuator operable to move the movable floor panel from an extended position to a retracted position in response to an occurrence of a collision being determined or predicted based upon environment data collected by a collision sensor,
wherein the movable floor panel moves in a direction opposite the interior cabin as the movable floor panel moves from the extended position to the retracted position.

2. The footwell of claim 1, wherein the movable floor panel is translatable in a forward vehicle longitudinal direction and/or a downward vehicle vertical direction from the extended position to the retracted position.

3. The footwell of claim 1, wherein the movable floor panel is rotatable relative to a forward end or a rearward end of the lower floor panel.

4. The footwell of claim 3, further comprising a floor pin extending through the movable floor panel defining a pivot point about which the movable floor panel rotates, wherein the actuator is configured to rotate the floor pin to move the movable floor panel from the extended position to the retracted position.

5. The footwell of claim 1, further comprising a foot airbag module, the foot airbag module comprising:
a housing;
an inflator provided within the housing; and
an airbag body provided within the housing and in fluid communication with the inflator, the airbag body configured to be deployed in response to an occurrence of a collision being determined or predicted, the airbag body configured to deploy to at least a location previously occupied by the movable floor panel when in the extended position.

6. The footwell of claim 5, wherein the airbag body is configured to deploy through a space formed between a lower end of the movable floor panel and a forward end of the lower floor panel.

7. The footwell of claim 1, further comprising a pedal assembly movable from an extended position to a retracted position in response to an occurrence of a collision being determined or predicted.

8. The footwell of claim 7, wherein the pedal assembly comprises:
an upper pedal arm pivotally coupled to an upper floor panel of the footwell;
a lower pedal arm pivotally coupled to the upper pedal arm;
a pedal pad provided on a front surface of the lower pedal arm; and
a pedal actuator extending between the upper floor panel and the upper pedal arm, the pedal actuator operable to move the upper pedal arm and move the pedal assembly from the extended position to the retracted position.

9. The footwell of claim 8, further comprising:
a shear pin extending through the upper pedal arm and the upper floor panel; and
a shear pin controller configured to cause the shear pin to shear from the upper pedal arm and permit the upper pedal arm to move in response to an occurrence of a collision being determined or predicted.

10. The footwell of claim 8, wherein:

the pedal actuator is a pyrotechnic actuator extending between the upper pedal arm and the upper floor panel; and the footwell further comprises a pyrotechnic actuator controller configured to cause the pyrotechnic actuator to move the upper pedal arm.

11. A vehicle comprising:

a frame defining an interior cabin;

a driver seat mounted to the frame within the interior cabin;

a collision sensor configured to collect environment data used to determine or predict an occurrence of a collision;

a footwell provided forward of the driver seat in a vehicle longitudinal direction, the footwell comprising:

a lower floor panel fixed to the frame, the lower floor panel defining a portion of the interior cabin;

a movable floor panel extending from the lower floor panel; and an actuator operable to move the movable floor panel from an extended position to a retracted position in response to an occurrence of a collision being determined or predicted based upon environment data collected by the collision sensor, wherein the movable floor panel moves in a direction opposite the interior cabin as the movable floor panel moves from the extended position to the retracted position.

12. The vehicle of claim 11, wherein the movable floor panel is rotatable relative to a forward end or a rearward end of the lower floor panel.

13. The vehicle of claim 12, wherein:

the footwell further comprises a floor pin extending through the movable floor panel to define a pivot point about which the movable floor panel rotates;

the actuator is configured to rotate the floor pin to move the movable floor panel from the extended position to the retracted position.

14. The vehicle of claim 11, wherein the movable floor panel is translatable relative to the lower floor panel.

15. The vehicle of claim 11, wherein the footwell further comprises a foot airbag module, the foot airbag module comprising:

a housing;

an inflator communicatively coupled to the collision sensor and provided within the housing; and an airbag body provided within the housing and in fluid communication with the inflator, the airbag body configured to be deployed in response to an occurrence of a collision being determined or predicted, the airbag body configured to deploy to at least a location previously occupied by the movable floor panel when in the extended position.

16. The vehicle of claim 15, further comprising:

a dashboard provided forward of the driver seat in a vehicle longitudinal direction; and a knee airbag module provided within the dashboard, the knee airbag module comprising:

a housing;

an inflator communicatively coupled to the collision sensor and provided within the housing; and an airbag body provided within the housing and in fluid communication with the inflator, the airbag body configured to be deployed in response to an occurrence of a collision being determined or predicted, the airbag body configured to deploy through the dashboard toward a knee of a driver seated in the driver seat.

17. A method comprising:

detecting or predicting an occurrence of a collision; and operating, in response to detecting or predicting the occurrence of the collision, an actuator to move a movable floor panel of a footwell from an extended position to a retracted position, the movable floor panel extending from a lower floor panel of the footwell, the lower floor panel defining a portion of an interior cabin, wherein the movable floor panel moves in a direction opposite the interior cabin as the movable floor panel moves from the extended position to the retracted position.

18. The method of claim 17, further comprising rotating the movable floor panel relative to a forward end or a rearward end of the lower floor panel when the movable floor panel moves from the extended position to the retracted position.

19. The method of claim 17, further comprising translating the movable floor panel relative to the lower floor panel when the movable floor panel moves from the extended position to the retracted position.

20. The method of claim 17, further comprising deploying an airbag body of a foot airbag module into a space formed in at least a location previously occupied by the movable floor panel when in the extended position.

* * * * *